(12) United States Patent
Ito et al.

(10) Patent No.: US 11,833,414 B2
(45) Date of Patent: Dec. 5, 2023

(54) LIGHT EMISSION CONTROL APPARATUS, OPERATION DEVICE, LIGHT EMISSION CONTROL METHOD, AND PROGRAM

(71) Applicant: Sony Interactive Entertainment Inc., Tokyo (JP)

(72) Inventors: Akinori Ito, Tokyo (JP); Toshimasa Aoki, Foster City, CA (US); Kosuke Suzuki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 115 days.

(21) Appl. No.: 17/297,159

(22) PCT Filed: Dec. 4, 2019

(86) PCT No.: PCT/JP2019/047471
§ 371 (c)(1),
(2) Date: May 26, 2021

(87) PCT Pub. No.: WO2020/116529
PCT Pub. Date: Jun. 11, 2020

(65) Prior Publication Data
US 2022/0023754 A1  Jan. 27, 2022

Related U.S. Application Data

(60) Provisional application No. 62/776,498, filed on Dec. 7, 2018.

(51) Int. Cl.
*A63F 13/2145* (2014.01)
*A63F 13/28* (2014.01)
(Continued)

(52) U.S. Cl.
CPC .......... *A63F 13/2145* (2014.09); *A63F 13/28* (2014.09); *A63F 13/843* (2014.09);
(Continued)

(58) Field of Classification Search
CPC .... A63F 13/2145; A63F 13/28; A63F 13/843; A63F 2300/301; A63F 2300/8076; A63F 2300/8088; H05B 47/105
(Continued)

(56) References Cited

U.S. PATENT DOCUMENTS 8,686,939 B2 * 4/2014 Mao ...................... A63F 13/211
345/158
9,690,392 B2 6/2017 Igarashi
(Continued)

FOREIGN PATENT DOCUMENTS

JP 2007097861 A 4/2007
JP 2014238723 A 12/2014
(Continued)

OTHER PUBLICATIONS

Notice of Reasons for Refusal for corresponding JP Application No. 2020559981, 8 pages, dated Jul. 15, 2022.
(Continued)

*Primary Examiner* — Allen Chan
(74) *Attorney, Agent, or Firm* — Matthew B. Dernier, Esq.

(57) ABSTRACT

A light emission control apparatus, an operation device, a light emission control method, and a program are provided that enable richer expression of an execution status of a program based on light emission from the operation device. A particular-light-emitting-area identifying section identifies, on the basis of information corresponding to an execution status of a program, a particular light emitting area that is a part of a light emitting area set on an operation device, the part corresponding to the information. A light emission control section causes at least part of the light emitting area to enable a particular light emitting area to be recognized.

18 Claims, 14 Drawing Sheets

(51) Int. Cl.
  *A63F 13/843* (2014.01)
  *H05B 47/105* (2020.01)
(52) U.S. Cl.
  CPC ...... *H05B 47/105* (2020.01); *A63F 2300/301* (2013.01); *A63F 2300/8076* (2013.01); *A63F 2300/8088* (2013.01)
(58) Field of Classification Search
  USPC .......................................................... 463/1
  See application file for complete search history.

(56) References Cited

U.S. PATENT DOCUMENTS

| | | | |
|---|---|---|---|
| 9,999,837 | B2 | 6/2018 | Kobayashi |
| 10,441,878 | B2 | 10/2019 | Kaneko |
| 10,967,268 | B2 | 4/2021 | Tsuchiya |
| 2007/0093291 | A1 | 4/2007 | Hulvey |
| 2008/0096654 | A1* | 4/2008 | Mondesir ................ A63F 13/24 463/31 |
| 2011/0077082 | A1* | 3/2011 | Marks ..................... G06F 3/017 463/36 |
| 2012/0295707 | A1 | 11/2012 | Nonaka |
| 2012/0322558 | A1* | 12/2012 | Tiley ..................... G06F 1/1632 463/37 |
| 2015/0193017 | A1 | 7/2015 | Igarashi |
| 2016/0082355 | A1 | 3/2016 | Kobayashi |
| 2016/0307332 | A1 | 10/2016 | Ranjan |
| 2017/0354868 | A1 | 12/2017 | Kaneko |
| 2018/0085671 | A1 | 3/2018 | Tsuchiya |

FOREIGN PATENT DOCUMENTS

| | | |
|---|---|---|
| JP | 2016153824 A | 8/2016 |
| JP | 2017217414 A | 12/2017 |
| JP | 2018088266 A | 6/2018 |
| WO | 2011096352 A1 | 8/2011 |
| WO | 2016136026 A1 | 9/2016 |

OTHER PUBLICATIONS

International Search Report for corresponding PCT Application No. PCT/JP2019/047471, 6 pages, dated Feb. 25, 2020.
International Preliminary Report on Patentability and Written Opinion for corresponding PCT Application No. PCT/JP2019/047471, 14 pages, dated Jun. 17, 2021.
Decision to Grant a Patent for corresponding JP Application No. 2020559981, 4 pages, dated Aug. 28, 2023.

* cited by examiner

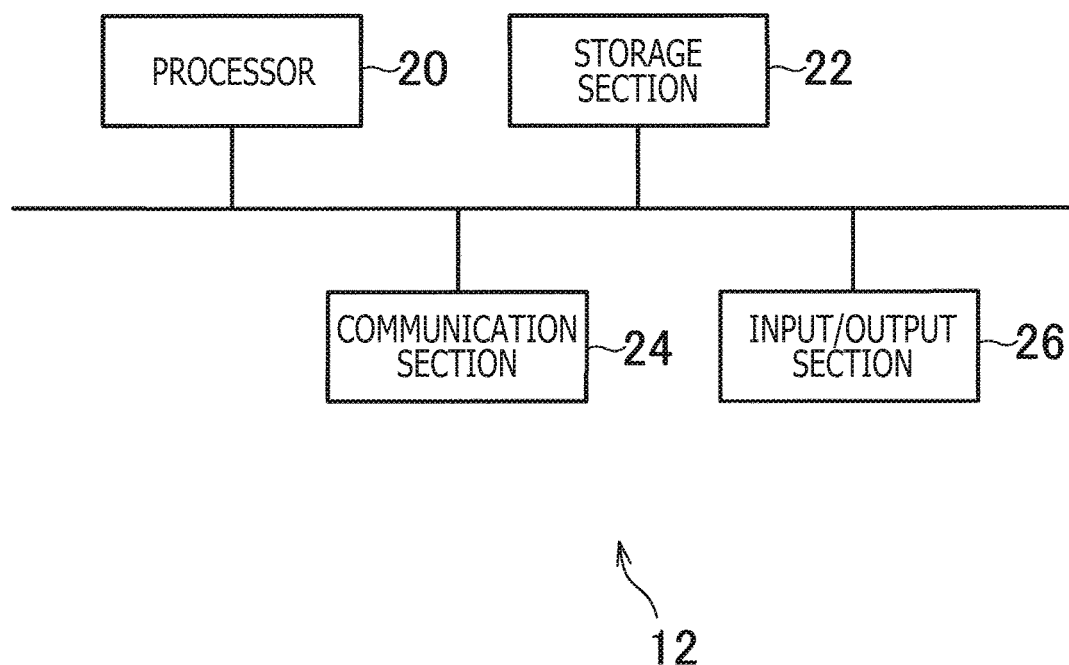

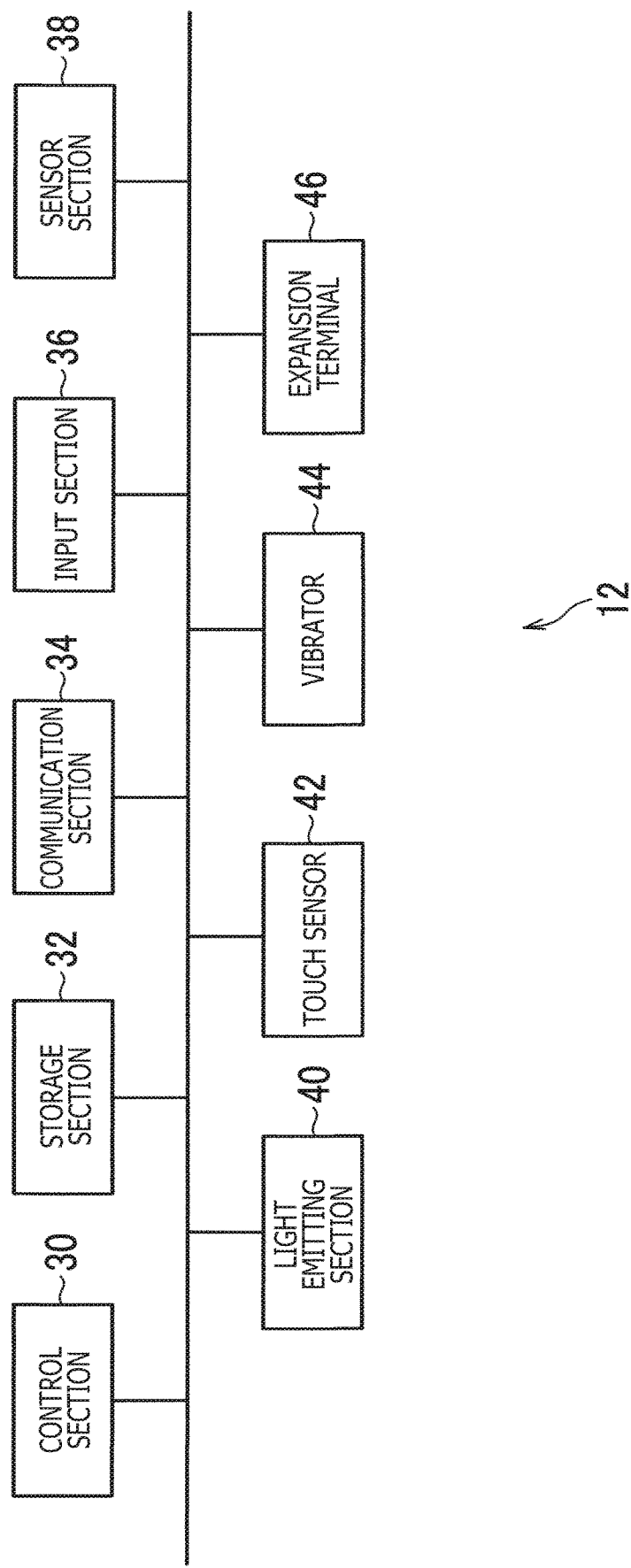

LIGHT EMISSION CONTROL APPARATUS, OPERATION DEVICE, LIGHT EMISSION CONTROL METHOD, AND PROGRAM

TECHNICAL FIELD

The present invention relates to a light emission control apparatus, an operation device, a light emission control method, and a program.

BACKGROUND ART

Operation devices utilized as input devices for entertainment apparatuses such as game apparatuses include, in some cases, a light emitting section emitting light corresponding to an execution status of a program such as a game program executed by the entertainment apparatus. Additionally, some of such operation devices include a light emitting section for indicating identification information regarding the operation device or a user.

SUMMARY

Technical Problem

However, the light emitting section in the related art emits entirely uniform light in a color corresponding to the execution status of the program. Thus, the related art is limited in the expression of the execution status of the program based on light emission from the operation device.

In view of these circumstances, an object of the present invention is to provide a light emission control apparatus, an operation device, a light emission control method, and a program enabling richer expression of the execution status of the program based on light emission from the operation device.

Solution to Problem

To accomplish the object, a light emission control apparatus according to the present invention includes a particular-light-emitting-area identifying section identifying, on the basis of information corresponding to an execution status of a program, a particular light emitting area that is a part of a light emitting area set on an operation device, the part corresponding to the information, and a light emission control section causing at least a part of the light emitting area to emit light to make the particular light emitting area recognizable.

In an aspect of the present invention, the information includes information causing a display section to display an image.

In this aspect, the light emission control apparatus may further include a particular-display-area identifying section identifying a particular display area that a portion of a reference display area occupying at least a part of the image, the portion being associated with the operation device, and the particular-light-emitting-area identifying section may identify the particular light emitting area in which a position in the light emitting area is associated with a position of the particular display area in the reference display area.

In this aspect, the light emission control apparatus may further include a display control section causing the display section to display the image depicting, in the reference display area, a play status of each of a plurality of users, the play status corresponding to an execution status of a program of a game played by the plurality of users, and the particular-display-area identifying section may identify, as the particular display area, an area in the image depicting the play status of the user operating the operation device.

In this aspect, the light emission control apparatus may further include a particular-display-area changing section changing a position of the particular display area in the reference display area, the light emission control section may change, in response to a change in the position of the particular display area, light emission from at least a part of the light emitting area such that the particular light emitting area associated with the changed particular display area is recognizable.

Additionally, in an aspect of the present invention, the light emitting area includes a plurality of partial light emitting areas, and the light emission control section causes at least one of the partial light emitting areas associated with the particular light emitting area to emit light.

Additionally, in an aspect of the present invention, the light emission control section causes at least a part of the light emitting area to emit light to make a color and the particular light emitting area corresponding to the information recognizable.

Additionally, in an aspect of the present invention, the light emission control section causes at least a part of the light emitting area to emit light to make the particular light emitting area recognizable and to make identification information associated with the operation device identifiable.

In this aspect, the light emitting area may include a first light emitting area and a second light emitting area, the particular-light-emitting-area identifying section may identify the particular light emitting area that is a part of the first light emitting area, the part corresponding to the image, the light emission control section may cause at least a part of the first light emitting area to emit light to make the particular light emitting area recognizable, and the light emission control section may cause at least a part of the second light emitting area to emit light to make the identification information identifiable.

Additionally, in an aspect of the present invention, the light emission control apparatus connect to a plurality of the operation devices, and the light emission control section changes, in response to an operation on one of the operation devices, light emission from at least a part of the light emitting area of the operation device different from the one of the operation devices.

Additionally, in an aspect of the present invention, the information includes information corresponding to an output from a sensor section.

Additionally, an operation device according to the present invention is an operation device with a set light emitting area, the operation device including a reception section receiving light emission control information identifying a part of the light emitting area on the basis of information corresponding to an execution status of a program, and a light emission control section causing a part of the light emitting area to emit light in accordance with the light emission control information.

In an aspect of the present invention, the operation device includes a touch sensor, and the touch sensor and the light emitting area at least partly overlap each other as viewed from above.

In this aspect, light emitting sections may be provided at positions corresponding to corner portions of the touch sensor.

Additionally, a light emitting section may be provided at a position corresponding to a central portion of the touch sensor.

Additionally, another operation device according to the present invention is an operation device with a set first light emitting area and a set second light emitting area, in which at least a part of the first light emitting area emits light to make a particular light emitting area recognizable, the particular light emitting area being a part corresponding to an image displayed on the display section, and at least a part of the second light emitting area emits light to make identification information associated with the operation device identifiable.

In an aspect of the present invention, at least a part of the first light emitting area emits light in accordance with a control signal corresponding to an execution status of an application program, and at least a part of the second light emitting area emits light in accordance with a control signal corresponding to an execution status of a system program.

Additionally, a light emission control method according to the present invention includes a step of identifying, on the basis of information corresponding to an execution status of a program, a particular light emitting area that is a part of a light emitting area set on an operation device, the part corresponding to the information, and a step of causing at least a part of the light emitting area to emit light to make the particular light emitting area recognizable.

Additionally, a program according to the present invention causes a computer to execute a step of identifying, on the basis of information corresponding to an execution status of a program, a particular light emitting area that is a part of a light emitting area set on an operation device, the part corresponding to the information, and a step of causing at least a part of the light emitting area to emit light to make the particular light emitting area recognizable.

BRIEF DESCRIPTION OF DRAWINGS

FIG. 2A is a diagram illustrating an example of a configuration of an entertainment apparatus according to an embodiment of the present invention.

FIG. 2B is a diagram illustrating an example of a configuration of a controller according to an embodiment of the present invention.

DESCRIPTION OF EMBODIMENT

An embodiment of the present invention will be described below in detail on the basis of the drawings.

Figure 1:
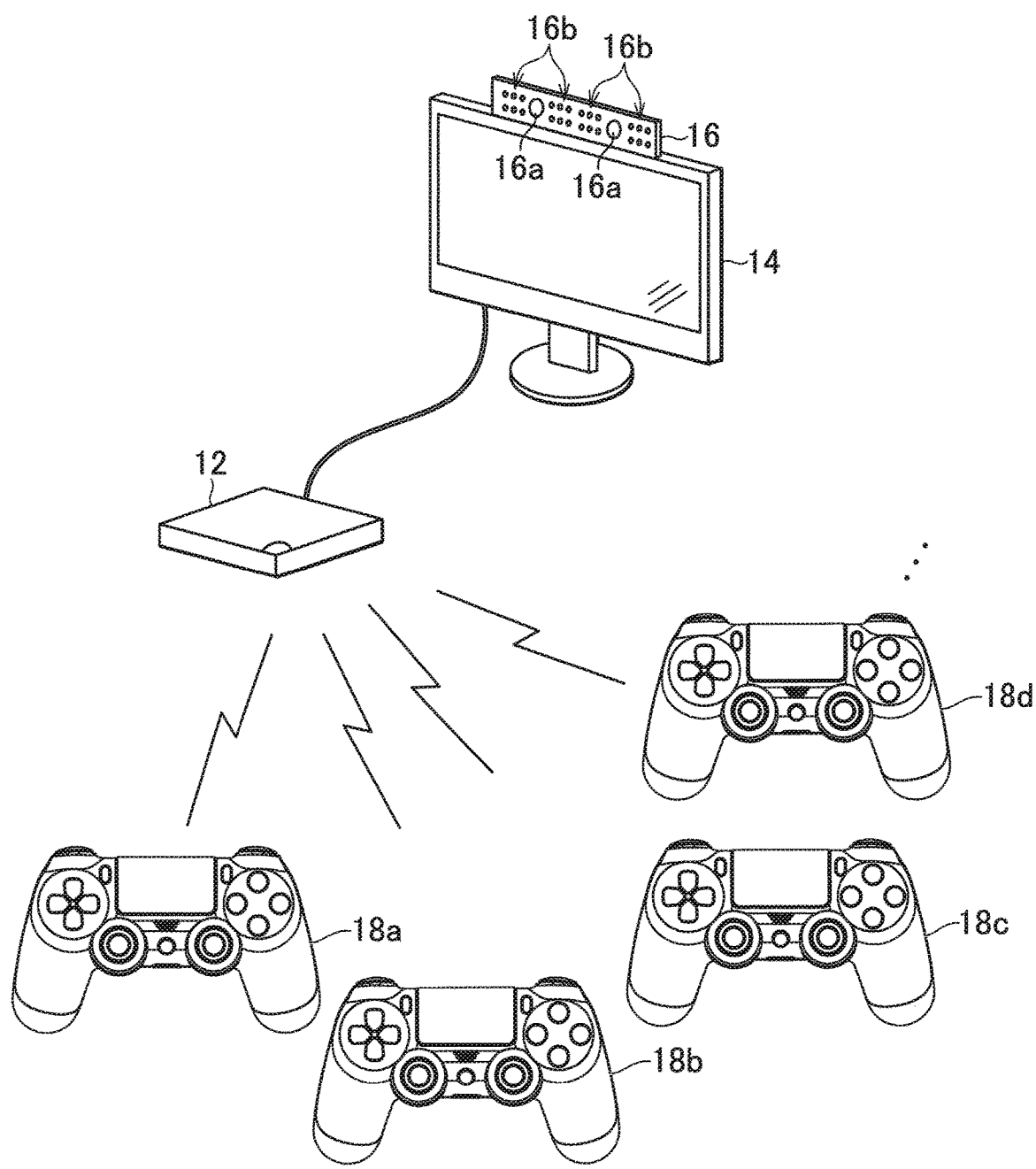
FIG. 1 is a diagram illustrating an example of a general configuration of an entertainment system according to an embodiment of the present invention.

FIG. 1 is a diagram illustrating an example of a general configuration of an entertainment system 10 according to an embodiment of the present invention. As illustrated in FIG. 1, the entertainment system 10 according to the present embodiment includes an entertainment apparatus 12, a display 14, a camera microphone unit 16, and a controller 18.

The entertainment apparatus 12 according to the present embodiment is, for example, a game console, a digital versatile disc (DVD) player, or a Blu-ray (registered trademark) player. The entertainment apparatus 12 according to the present embodiment, for example, generates videos and sounds through execution of a game program or reproduction of contents, the game program or content being stored or recorded in an optical disc. The entertainment apparatus 12 according to the present embodiment outputs video signals representing generated videos and sound signals representing generated sounds.

For example, as illustrated in FIG. 2A, the entertainment apparatus 12 according to the present embodiment includes a processor 20, a storage section 22, a communication section 24, and an input/output section 26.

The processor 20 is, for example, a program control device such as a central processing unit (CPU) which operates in accordance with programs installed in the entertainment apparatus 12. The processor 20 according to the present embodiment includes a GPU (Graphics Processing Unit) writing images to a frame buffer on the basis of graphics commands and data.

The storage section 22 includes, for example, storage elements such as a read-only memory (ROM) and a random access memory (RAM), and a hard disk drive. The storage section 22 stores programs executed by the processor 20. Additionally, the storage section 22 according to the present embodiment includes a reserved region for the frame buffer to which the GPU writes images.

The communication section 24 is a communication interface, for example, a network board, a wireless local area network (LAN) module, or a Bluetooth (registered trademark) module.

The input/output section 26 is an input/output port such as an HDMI (registered trademark) (High-Definition Multimedia Interface) port or a universal serial bus (USB) port.

The display 14 according to the present embodiment is, for example, a liquid crystal display on which videos expressed by video signals output from the entertainment apparatus 12 are displayed.

The camera microphone unit 16 includes, for example, a camera 16a outputting a captured image of a subject to the entertainment apparatus 12, and a microphone 16b acquiring and converting ambient sounds into sound data and outputting the sound data to the entertainment apparatus 12. Additionally, the camera 16a according to the present embodiment is a stereo camera.

The entertainment apparatus 12 and the display 14 are connected together, for example, via an audio visual (AV) cable or an HDMI cable. The entertainment apparatus 12 and the camera microphone unit 16 are connected together, for example, via a USB cable, an AV cable, or an HDMI (registered trademark) (High-Definition Multimedia Interface) cable.

The controller 18 (18a, 18b, 18c, 18d, . . . ) according to the present embodiment is an operation device for providing operation inputs to the entertainment apparatus 12.

For example, as illustrated in FIG. 2B, the controller 18 according to the present embodiment includes a control section 30, a storage section 32, a communication section 34, an input section 36, a sensor section 38, a light emitting section 40, a touch sensor 42, a vibrator 44, and an expansion terminal 46.

The control section 30 is a control device, for example, a digital signal processor (DSP). The storage section 32 is a storage element, for example, a memory. The communication section 34 is a communication interface, for example, a wireless LAN module or a Bluetooth module. The input section 36 includes input operation members such as direction keys, buttons, an operation stick, a touch pad, and a keypad. The sensor section 38 includes devices such as an acceleration sensor, a motion sensor, a gyro sensor, and a global positioning system (GPS) module. The light emitting section 40 is a device including a light source, for example, a light-emitting diode (LED). The light emitting section 40 may include a plurality of light sources in different colors (for example, light sources in red, green, and blue). Note that the light emitting section 40 may include a light guide plate (light diffusing member) including acrylic or polycarbonate as a material. Additionally, the light emitting section 40 may be a display device such as a liquid crystal display (LCD). The touch sensor 42 is a device capable of detecting the position of an object such as a finger of a user. The vibrator 44 is a vibrating device such as an actuator. The expansion terminal 46 is a terminal such as a USB port.

Figure 3:
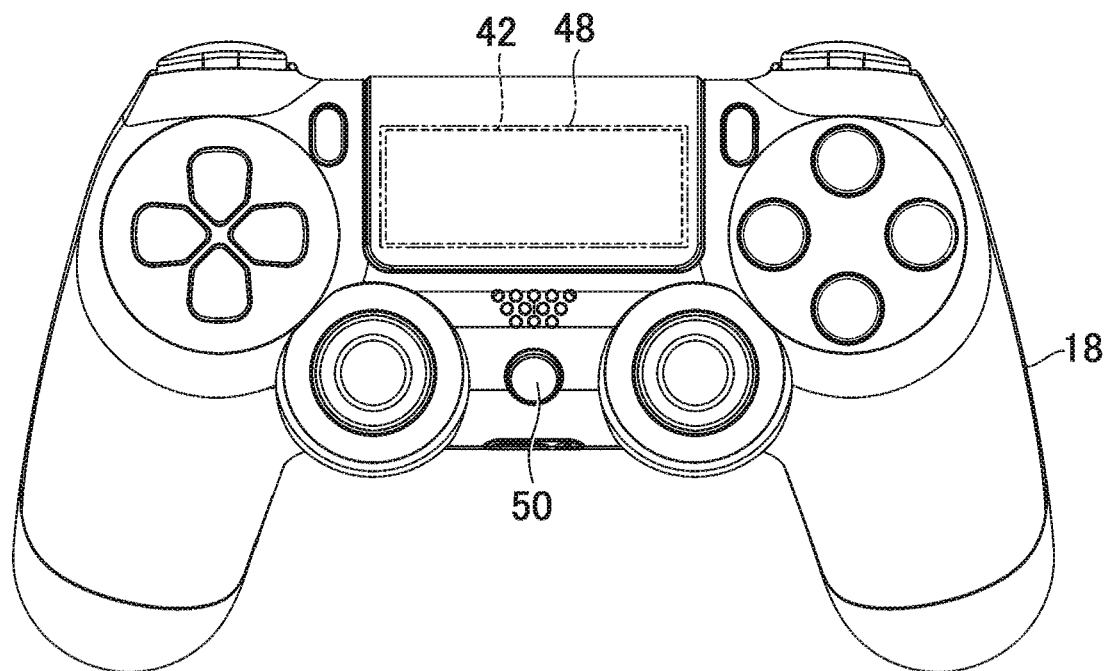
FIG. 3 is a diagram illustrating an example of an upper surface of a controller according to an embodiment of the present invention.

FIG. 3 illustrate an example of an upper surface of the controller 18. Hereinafter, an upper direction in FIG. 3 is assumed to correspond to a front direction of the controller 18, and a lower direction in FIG. 3 is assumed to correspond to a rear direction of the controller 18.

As illustrated in FIG. 3, the controller 18 according to the present embodiment includes direction keys, buttons, and an operation stick. By depressing any of the direction keys and buttons provided on the controller 18 or tilting the operation stick, a user can provide various operation inputs using the controller 18. Additionally, outputs from the sensor section 38 in response to movement of the controller 18 can be used to provide various operation inputs. In the present embodiment, the controller 18 outputs, to the entertainment apparatus 12, input data associated with the operation inputs.

Additionally, as illustrated in FIG. 3, the touch sensor 42 capable of detecting the position of the object such as the finger of the user is provided in the center of the front side of the upper surface of the controller 18 according to the present embodiment.

In the present embodiment, the controller 18 includes a light emitting area 48 at least partially overlapping the touch sensor 42 as viewed from above. Here, as the light emitting area 48, an area may be set that includes the area occupied by the touch sensor 42 as viewed from above and that is larger than the area occupied by the touch sensor 42. Additionally, as the light emitting area 48, an area may be set that overlaps the touch sensor 42 as viewed from above. In the controller 18 according to the present embodiment, for example, a lower surface (rear surface) of the touch sensor 42 is provided with a light emitting section 40 including a light source such as an LED. The light emitting section 40 includes a plurality of light sources in different colors (for example, light sources in red, green, and blue). The light emitting section 40 may include a light guide plate (light diffusing member) including acrylic or polycarbonate as a material.

Additionally, below the touch sensor 42 and the light emitting section 40, a switch for sensing that the touch sensor 42 has been depressed is disposed. Thus, the touch sensor 42 functions as a button capable of performing an on/off operation.

When the user performs a touch operation on the touch sensor 42 with the finger or the like, the controller 18 outputs, to the entertainment apparatus 12, input data indicative of the position where the touch operation has been performed. Additionally, when the user performs an on/off operation on the above-described switch, the controller 18 outputs, to the entertainment apparatus 12, input data indicating that the on/off operation has been performed. Note that, in this case, to the entertainment apparatus 12, input data may be output that indicates a position detected by the touch sensor 42 when an on/off operation is performed and that also indicates that the on/off operation has been performed.

Additionally, the controller 18 according to the present embodiment can output input data to the entertainment apparatus 12 by wire by being connected to the entertainment apparatus 12 by a USB cable. Additionally, the controller 18 according to the present embodiment is configured to be capable of wirelessly outputting input data to the entertainment apparatus 12.

The controller 18 according to the present embodiment receives a light emission control signal transmitted from the entertainment apparatus 12. The light emission control signal includes information indicating, for example, the color of light to be emitted and an area from which light is to be emitted. The controller 18 causes at least a part of the light emitting area 48 to emit light, in accordance with the information indicated by the light emission control signal.

Additionally, in the present embodiment, a predetermined connection operation such as depression, against the controller 18, of a connection button 50 illustrated in FIG. 3 is performed to connect the controller 18 to the entertainment apparatus 12 to enable operation inputs to be provided using the controller 18. Additionally, the entertainment apparatus 12 according to the embodiment can be connected to a plurality of the controllers 18. In the present embodiment, identification information associated with the controller 18 is assigned to the controller 18 connected to the entertainment apparatus 12. The identification information associated with the controller 18 is hereinafter referred to as a device identification (ID) of the controller 18. Here, for example, for controllers 18 connected to the entertainment apparatus 12, the device IDs may be set that are associated with the controllers 18 in the order that the controllers 18 are connected to the entertainment apparatus 12.

Additionally, inside the entertainment apparatus 12, a table may be managed in which IDs specific to the controllers 18 are associated with the device IDs. The table may include user IDs registered in the table and used to log into the entertainment apparatus 12. Data received from the controller 18 may include the ID specific to the controller 18. The entertainment apparatus 12 may be configured to be able to associate the received data, the device ID used for processing by the controller 18 and an application, and the user ID with one another. Additionally, as the above-described identification information, the user ID and the controller-specific ID may be used besides the device ID.

Four controllers 18 are hereinafter assumed to be connected to the entertainment apparatus 12 in the order of a controller 18a, a controller 18b, a controller 18c, and a controller 18d. It is assumed that 1 is set for the controller 18a as a device ID, 2 is set for the controller 18b as a device ID, 3 is set for the controller 18c as a device ID, and 4 is set for the controller 18d as a device ID. Note that the device ID may be, for example, information indicative of a color instead of the number.

Figure 4:
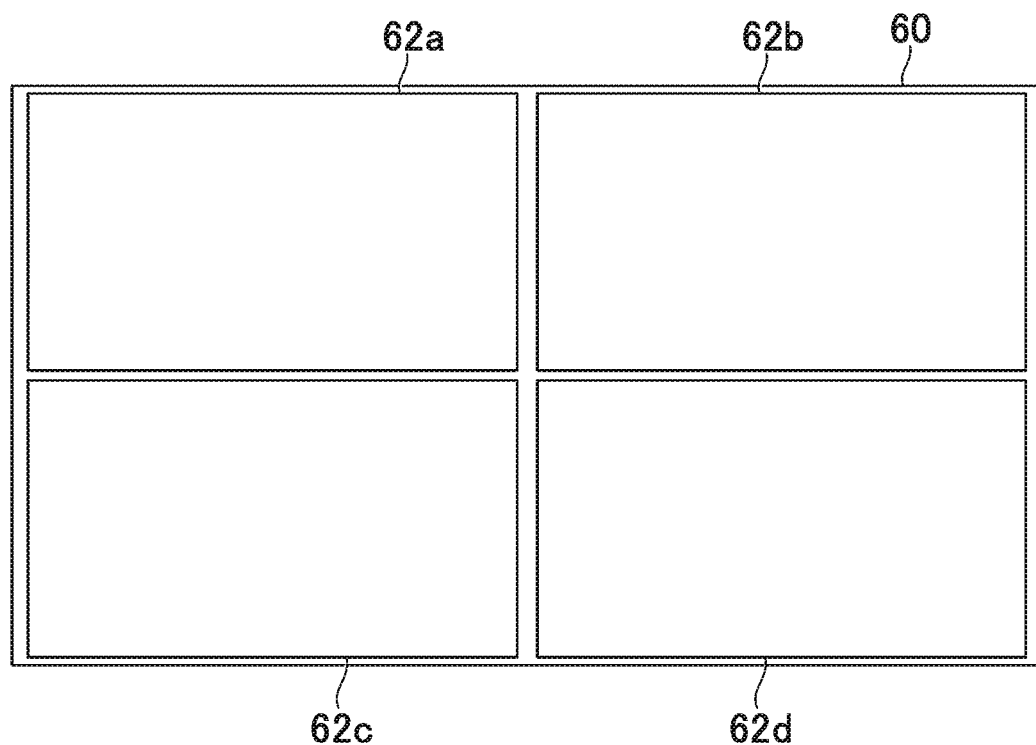
FIG. 4 is a diagram illustrating an example of a play status image.

In the present embodiment, for example, the display 14 displays an image corresponding to a play status of a game played by a plurality of users. FIG. 4 is a diagram schematically illustrating a play status image 60 that is the image corresponding to the play status of the game played by a plurality of users. The play status image 60 illustrated in FIG. 4 illustrates the play status of each of four users. Each of the users operates the controller 18 to play the game while viewing the play status image 60 displayed on the display 14.

For example, a play area 62a positioned in the upper left of the play status image 60 depicts the play status of the user operating the controller 18a. Additionally, for example, a play area 62b positioned in the upper right of the play status image 60 depicts the play status of the user operating the controller 18b. Additionally, for example, a play area 62c positioned in the lower left of the play status image 60 depicts the play status of the user operating the controller 18c. Additionally, for example, a play area 62d positioned in the lower right of the play status image 60 depicts the play status of the user operating the controller 18d.

In this case, control is performed such that the light emitting area 48 of each of the controllers 18a to 18d emits light according to the position, in the play status image 60, of the play area 62 indicating the play status of the user operating the controller 18.

Figure 5:
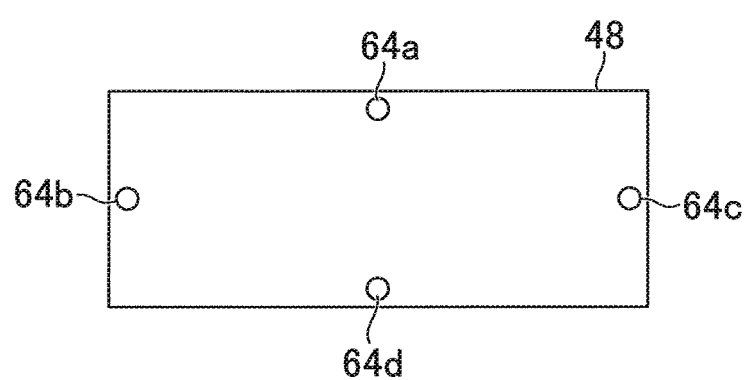
FIG. 5 is a diagram illustrating an example of a partial light emitting area.

FIG. 5 is a diagram schematically illustrating an example of the partial light emitting area 64 according to the present embodiment. In the example in FIG. 4, the light emitting area 48 includes four partial light emitting areas 64a, 64b, 64c, and 64d. The partial light emitting areas 64a, 64b, 64c, and 64d are disposed at an upper end, a left end, a right end, and a lower end of the light emitting area 48.

In the present embodiment, for example, when the play status image 60 illustrated in FIG. 4 is displayed on the display 14, on the controller 18a, the partial light emitting area 64a and partial light emitting area 64b positioned in the upper left of the light emitting area 48 emit light. At this time, the partial light emitting area 64a and the partial light emitting area 64b may emit light in a color corresponding to the device ID of the controller 18a (for example, blue). In this case, the partial light emitting area 64c and the partial light emitting area 64d emit no light.

On the controller 18b, the partial light emitting area 64a and partial light emitting area 64c positioned in the upper right of the light emitting area 48 emit light. At this time, the partial light emitting area 64a and the partial light emitting area 64c may emit light in a color corresponding to the device ID of the controller 18b (for example, red). In this case, the partial light emitting area 64b and the partial light emitting area 64d emit no light.

On the controller 18c, the partial light emitting area 64b and partial light emitting area 64d positioned in the lower left of the light emitting area 48 emit light. At this time, the partial light emitting area 64b and the partial light emitting area 64d may emit light in a color corresponding to the device ID of the controller 18c (for example, green).

On the controller 18d, the partial light emitting area 64c and partial light emitting area 64d positioned in the lower right of the light emitting area 48 emit light. At this time, the partial light emitting area 64c and the partial light emitting area 64d may emit light in a color corresponding to the device ID of the controller 18d (for example, magenta).

As described above, the position of the partial light emitting area 64 in the light emitting area 48 of the controller 18 corresponds to the position, in the play status image 60, of the play area 62 indicating the play status of the user operating the controller 18. Thus, according to the present embodiment, by viewing the controller 18 operated by the user, the user can easily determine where the play area 62 depicting the play status of the user is located within the play status image 60.

The functions of the entertainment apparatus 12 according to the present embodiment will be further described focusing on light emission control on the light emitting area 48.

Figure 6A:
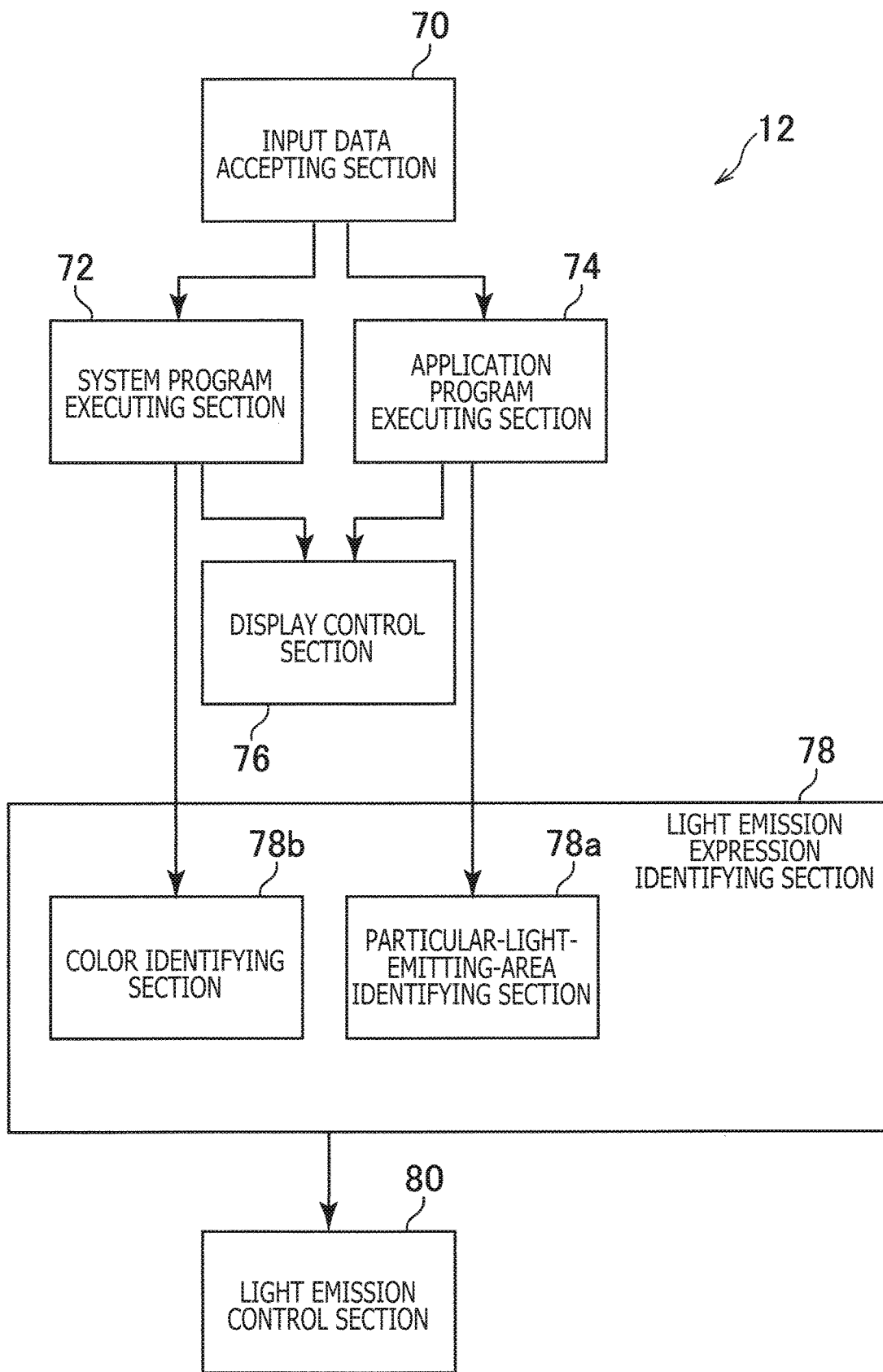
FIG. 6A is a functional block diagram illustrating an example of functions implemented in an entertainment apparatus according to an embodiment of the present invention.

FIG. 6A is a functional block diagram illustrating an example of functions implemented in the entertainment apparatus 12 according to the present embodiment. Note that not all the functions illustrated in FIG. 6A need to be implemented in the entertainment apparatus 12 according to the present embodiment and that functions other than the functions illustrated in FIG. 6A may be implemented in the entertainment apparatus 12.

As illustrated in FIG. 6A, the entertainment apparatus 12 according to the present embodiment functionally includes an input data accepting section 70, a system program executing section 72, an application program executing section 74, a display control section 76, a light emission expression identifying section 78, and a light emission control section 80. Additionally, the light emission expression identifying section 78 includes a particular-light-emitting-area identifying section 78a and a color identifying section 78b.

The input data accepting section 70 is mainly implemented in the communication section 24. The system program executing section 72, the application program executing section 74, and the light emission expression identifying section 78 are mainly implemented in the processor 20. The display control section 76 is mainly implemented in the processor 20 and the input/output section 26. The light emission control section 80 is mainly implemented in the processor 20 and the communication section 24.

The above-described functions are implemented by the processor 20 by executing a program that includes commands corresponding to the above-described functions and are installed in the entertainment apparatus 12, which is a computer. The program is supplied to the entertainment apparatus 12, for example, via a computer readable storage medium such as an optical disc, a magnetic disk, a magnetic tape, a magneto-optical disc, or a flash memory or via the Internet or the like.

Figure 6B:
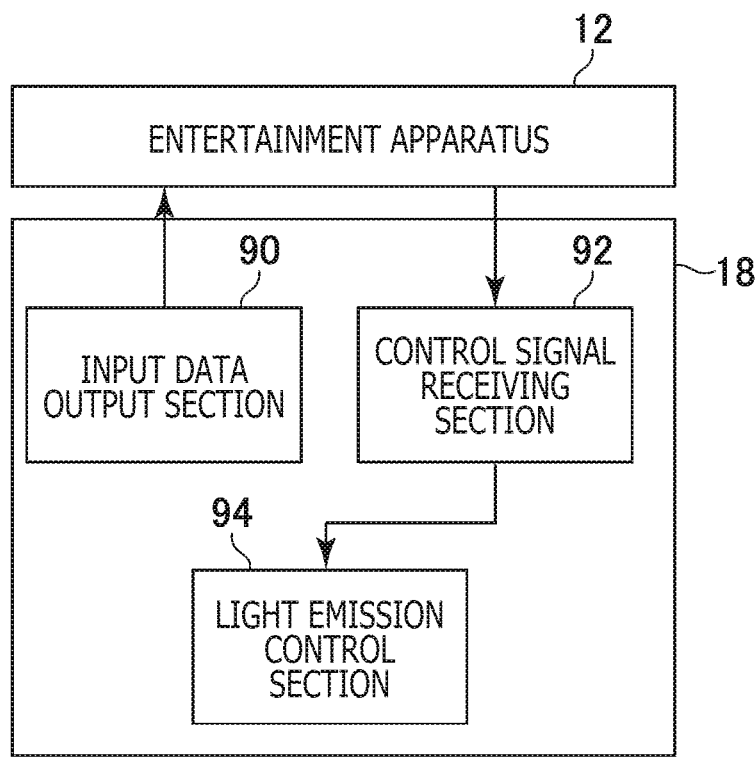
FIG. 6B is a functional block diagram illustrating an example of functions implemented in a controller according to an embodiment of the present invention.

FIG. 6B is a functional block diagram illustrating an example of functions implemented in the controller 18 according to the present embodiment. Note that not all the functions illustrated in FIG. 6B need to be implemented in the entertainment apparatus 12 according to the present embodiment and that functions other than the functions illustrated in FIG. 6B may be implemented in the entertainment apparatus 12.

As illustrated in FIG. 6B, the controller 18 according to the present embodiment functionally includes, for example, an input data output section 90, a control signal receiving section 92, and a light emission control section 94.

The input data output section 90 and the control signal receiving section 92 are mainly implemented in the communication section 34. The light emission control section 94 is mainly implemented in the control section 30 and the light emitting section 40.

In the present embodiment, for example, the input data accepting section 70 accepts input data transmitted by the controller 18.

In the present embodiment, for example, the system program executing section 72 executes a system program installed in the entertainment apparatus 12. Here, the system program executing section 72 may execute processing corresponding to the input data accepted by the input data accepting section 70.

In the present embodiment, for example, the application program executing section 74 executes an application program such as a program of a game installed in the entertainment apparatus 12. Here, the application program executing section 74 may execute processing corresponding to the input data accepted by the input data accepting section 70.

In the present embodiment, for example, the display control section 76 causes the display section such as the display 14 to display an image corresponding to the execution status of the program. The display control section 76 may cause the display section such as the display 14 to display an image corresponding to the execution status of the system program executed by the system program executing section 72. Additionally, the display control section 76 may cause the display section such as the display 14 to display an image corresponding to the execution status of the application program executed by the application program executing section 74. The display control section 76 may cause the display 14 to display, for example, the play status image 60 illustrated in FIG. 4.

In the present embodiment, for example, the light emission expression identifying section 78 identifies a light emission expression (for example, the area from which light is to be emitted and a light emission color) of the light emitting area 48 of the controller 18.

Figure 7:
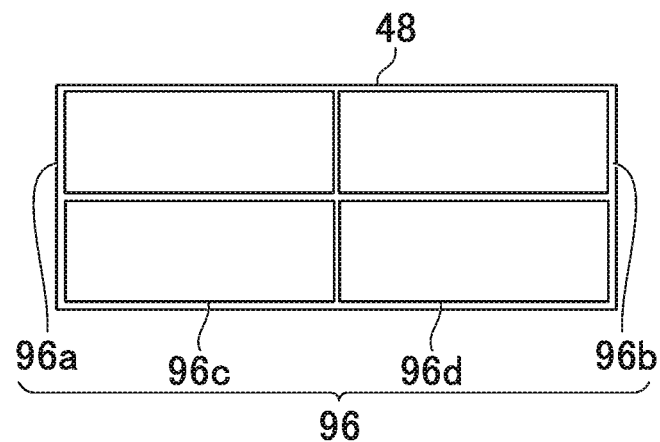
FIG. 7 is a diagram illustrating an example of a particular light emitting area.

In the present embodiment, for example, the particular-light-emitting-area identifying section 78a included in the light emission expression identifying section 78 identifies a particular light emitting area 96 that is at least a part of the light emitting area 48. FIG. 7 is a diagram illustrating an example of the particular light emitting area 96.

In the present embodiment, for example, the particular-light-emitting-area identifying section 78a identifies, on the basis of information corresponding to the execution status of the program, the particular light emitting area 96 that is a part of the light emitting area 48 set on the controller 18, the part corresponding to the information. The information may include information causing the display section to display an image. Here, the particular-light-emitting-area identifying section 78a may identify the particular light emitting area 96 on the basis of an image controlled to be displayed by the display control section 76. Additionally, for example, when the play status image 60 illustrated in FIG. 4 is displayed, the particular light emitting area 96 associated with the controller 18 is identified on the basis of the position, in the play status image 60, of the play area 62 indicating the play status of the user operating the controller 18. Here, the position, in the play status image 60, of the play area 62 indicating the play status of the user operating the controller 18 may correspond to the position, in the light emitting area 48, of the particular light emitting area 96 associated with the controller 18.

For example, the play area 62a positioned in the upper left of the play status image 60 depicts the play status of the user operating the controller 18a. In this case, a particular light emitting area 96a positioned in the upper left of the light emitting area 48 may be identified as the particular light emitting area 96 associated with the controller 18a. Similarly, a particular light emitting area 96b positioned in the upper right of the light emitting area 48 may be identified as the particular light emitting area 96 associated with the controller 18b. Additionally, a particular light emitting area 96c positioned in the lower left of the light emitting area 48 may be identified as the particular light emitting area 96 associated with the controller 18c. Additionally, a particular light emitting area 96d positioned in the lower right of the light emitting area 48 may be identified as the particular light emitting area 96 associated with the controller 18d.

In the present embodiment, for example, the color identifying section 78b included in the light emission expression identifying section 78 identifies a color corresponding to the device ID of the controller 18. Here, for example, when the system program executing section 72 executes processing of connecting the controller 18 and the entertainment apparatus 12, the color identifying section 78b may identify the color corresponding to the device ID of the controller 18.

In the present embodiment, the correspondence between the device ID and the color is assumed to be prescribed. For example, device ID values of 1, 2, 3, and 4 are respectively associated with blue, red, green, and magenta. Thus, for the controller 18a with the device ID 1, the color corresponding to the device ID is identified as blue. Additionally, for the controller 18b with the device ID 2, the color corresponding to the device ID is identified as red. Additionally, for the controller 18c with the device ID 3, the color corresponding to the device ID is identified as green. Additionally, for the controller 18d with the device ID 4, the color corresponding to the device ID is identified as magenta.

In the present embodiment, for example, the light emission control section 80 causes at least a part of the light emitting area 48 to emit light to enable the particular light emitting area 96 recognized. Here, the light emission control section 80 may cause at least one partial light emitting area 64 included in the plurality of partial light emitting areas 64 and associated with the particular light emitting area 96 to emit light. Additionally, the light emission control section 80 may cause at least a part of the light emitting area 48 to emit light to enable recognition of the color and the particular light emitting area 96 corresponding to the information corresponding to the execution status of the program.

Additionally, the light emission control section 80 may cause at least a part of the light emitting area 48 to emit light to enable the particular light emitting area 96 to be recognized while enabling the device ID of the controller 18 to be identified. For example, the light emission control section 80 may cause at least one partial light emitting area 64 associated with the particular light emitting area 96 to emit light in a color corresponding to the device ID of the controller 18. Additionally, in this case, the partial light emitting areas 64 other than the at least one partial light emitting area 64 associated with the particular light emitting area 96 may be controlled so as not to emit light.

On the basis of the particular light emitting area 96 identified by the particular-light-emitting-area identifying section 78*a*, the light emission control section 80 may identify at least one partial light emitting area 64 associated with the particular light emitting area 96. For example, as the partial light emitting area 64 associated with the particular light emitting area 96*a*, the partial light emitting area 64*a* and partial light emitting area 64*b* disposed in the particular light emitting area 96*a* may be identified. Additionally, as the partial light emitting area 64 associated with the particular light emitting area 96*b*, the partial light emitting area 64*a* and partial light emitting area 64*c* disposed in the particular light emitting area 96*b* may be identified. Additionally, as the partial light emitting area 64 associated with the particular light emitting area 96*c*, the partial light emitting area 64*b* and partial light emitting area 64*d* disposed in the particular light emitting area 96*c* may be identified. Additionally, as the partial light emitting area 64 associated with the particular light emitting area 96*d*, the partial light emitting area 64*c* and partial light emitting area 64*d* disposed in the particular light emitting area 96*d* may be identified.

Then, the light emission control section 80 may transmit, to the controller 18, a light emission control signal indicating the color identified by the color identifying section 78*b* and at least one partial light emitting area 64 identified. Then, the controller 18 may accept the light emission control signal. Then, in response to the acceptance of the light emission control signal, the light emitting section 40 of the controller 18 may emit light to enable recognition of the color and the particular light emitting area 96 corresponding to the device ID of the controller 18. For example, control may be performed such that the light emitting section 40 of the controller 18 causes the partial light emitting area 64 indicated by the light emission control signal to emit light in the color indicated by the light emission control signal.

In this manner, the partial light emitting area 64*a* and partial light emitting area 64*b* of the controller 18*a* emit light in blue as described above. The partial light emitting area 64*a* and partial light emitting area 64*c* of the controller 18*b* emit light in red. The partial light emitting area 64*b* and partial light emitting area 64*d* of the controller 18*c* emit light in green. The partial light emitting area 64*c* and partial light emitting area 64*d* of the controller 18*d* emit light in magenta.

In the present embodiment, for example, the input data accepting section 90 outputs the above-described input data to the entertainment apparatus 12.

In the present embodiment, for example, the control signal receiving section 92 receives the above-described light emission control signal.

In the present embodiment, for example, the light emission control section 94 causes a part of the light emitting area 48 to emit light in accordance with the light emission control signal received by the control signal receiving section 92. The light emission control section 94 may cause the partial light emitting area 64 that is disposed at a position corresponding to a corner portion of the touch sensor 42 and that is a part of the light emitting area 48. In this case, the light emitting sections 40 may be provided at positions corresponding to corner portions of the touch sensor 42. Additionally, the light emission control section 94 may cause the partial light emitting area 64 that is disposed at a position corresponding to a central position of the touch sensor 42 and that is a part of the light emitting area 48. In this case, the light emitting section 40 may be provided at the position corresponding to the central position of the touch sensor 42.

Figure 8:
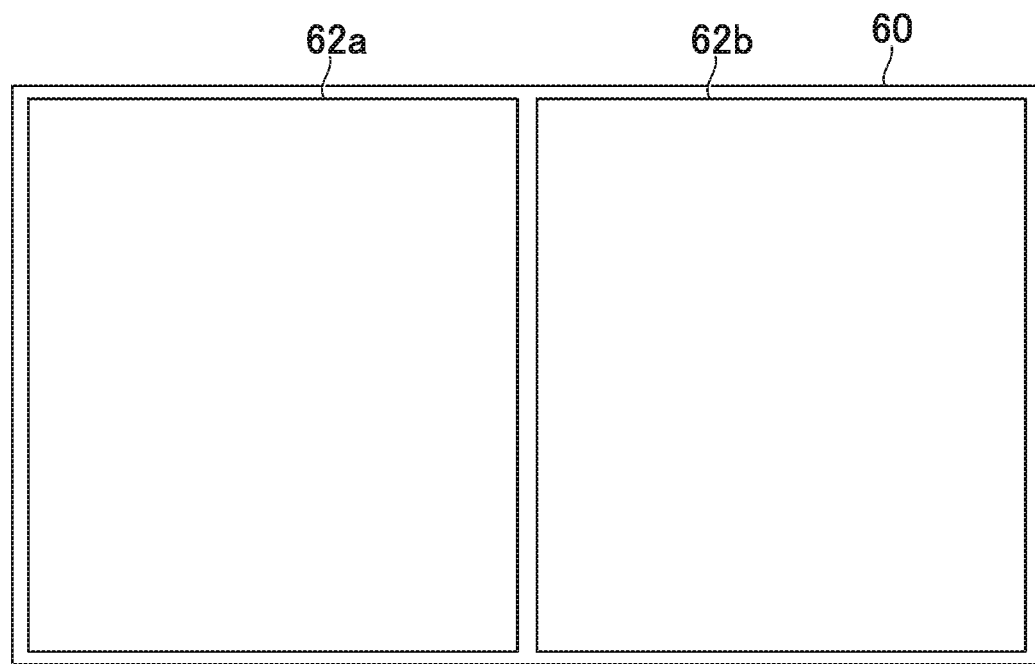
FIG. 8 is a diagram illustrating an example of a play status image.

FIG. 8 is a diagram schematically illustrating an example of the play status image 60 corresponding to the play status of a game played by two users. The play status image 60 illustrated in FIG. 8 illustrates the play statuses of the user operating the controller 18*a* and the user operating the controller 18*b*. In the example in FIG. 8, the play area 62*a* positioned in a left side of the play status image 60 depicts the play status of the user operating the controller 18*a*. Additionally, for example, the play area 62*b* positioned in a right side of the play status image 60 depicts the play status of the user operating the controller 18*b*.

Figure 9:
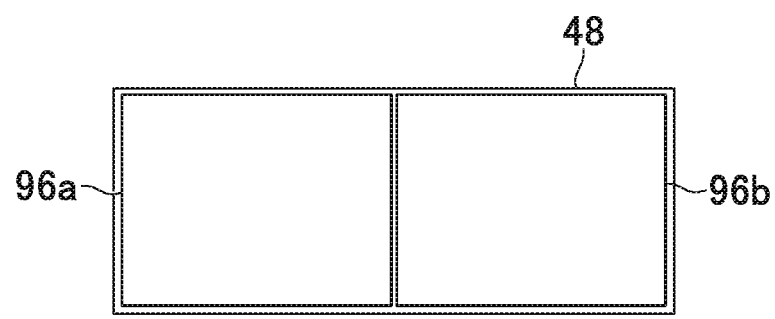
FIG. 9 is a diagram illustrating an example of a particular light emitting area.

In the example in FIG. 8, the left area of the light emitting area 48 is identified as the particular light emitting area 96*a* as illustrated in FIG. 9. The right area of the light emitting area 48 is identified as the particular light emitting area 96*b*.

In this case, as the partial light emitting area 64 associated with the particular light emitting area 96*a* illustrated in FIG. 9, the partial light emitting area 64*a*, partial light emitting area 64*b*, and partial light emitting area 64*d* disposed at the position of the particular light emitting area 96*a* are identified. As the partial light emitting area 64 associated with the particular light emitting area 96*b* illustrated in FIG. 9, the partial light emitting area 64*a*, partial light emitting area 64*c*, and partial light emitting area 64*b* disposed at the position of the particular light emitting area 96*b* are identified.

In this case, the partial light emitting area 64*a*, partial light emitting area 64*b*, and partial light emitting area 64*d* of the controller 18*a* emit light in blue. The partial light emitting area 64*a*, partial light emitting area 64*c*, and partial light emitting area 64*d* of the controller 18*b* emit light in red.

Figure 10:
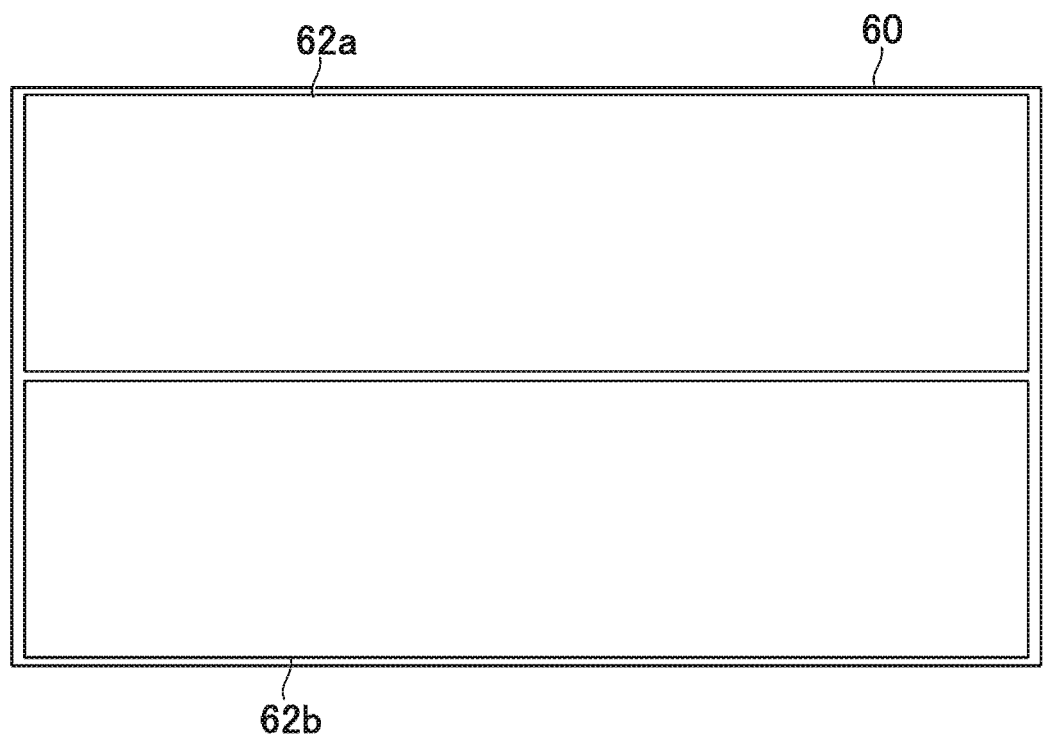
FIG. 10 is a diagram illustrating an example of a play status image.

FIG. 10 is a diagram schematically illustrating another example of the play status image 60 corresponding to the play status of a game played by two users. In the example in FIG. 10, the play area 62*a* positioned in an upper portion of the play status image 60 depicts the play status of the user operating the controller 18*a*. Additionally, for example, the play area 62*b* positioned in a lower portion of the play status image 60 depicts the play status of the user operating the controller 18*b*.

Figure 11:
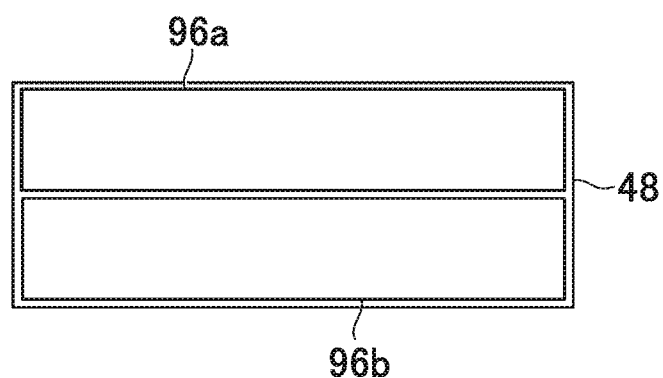
FIG. 11 is a diagram illustrating an example of a particular light emitting area.

In the example in FIG. 10, the upper area of the light emitting area 48 is identified as the particular light emitting area 96*a*, as illustrated in FIG. 11. The lower area of the light emitting area 48 is identified as the particular light emitting area 96*b*.

In this case, as the partial light emitting area 64 associated with the particular light emitting area 96*a* illustrated in FIG. 11, the partial light emitting area 64*a*, partial light emitting area 64*b*, and partial light emitting area 64*c* disposed at the position of the particular light emitting area 96*a* are identified. As the partial light emitting area 64 associated with the particular light emitting area 96*b* illustrated in FIG. 11, the partial light emitting area 64*b*, partial light emitting area 64*c*, and partial light emitting area 64*d* disposed at the position of the particular light emitting area 96*b* are identified.

In this case, the partial light emitting area 64*a*, partial light emitting area 64*b*, and partial light emitting area 64*c* of the controller 18*a* emit light in blue. The partial light emitting area 64*b*, partial light emitting area 64*c*, and partial light emitting area 64*d* of the controller 18*b* emit light in red.

Figure 12:
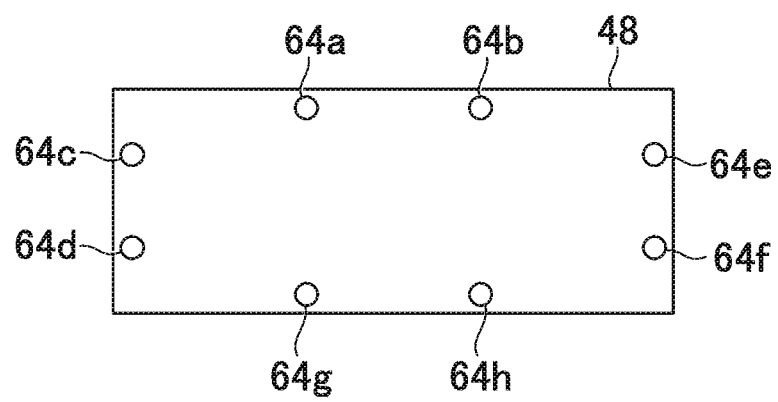
FIG. 12 is a diagram illustrating an example of a partial light emitting area.

Note that the arrangement of the partial light emitting areas 64 is not limited to the arrangement illustrated in FIG. 5. FIG. 12 is a diagram illustrating another example of the partial light emitting area 64. In the example in FIG. 12, the partial light emitting area 64a and the partial light emitting area 64b are arranged in juxtaposition at an upper end of light emitting area 48 such that the partial light emitting area 64a lies on the left of the partial light emitting area 64b. The partial light emitting area 64c and the partial light emitting area 64d are arranged in tandem at a left end of the light emitting area 48 such that the partial light emitting area 64c lies above the partial light emitting area 64d. The partial light emitting area 64e and the partial light emitting area 64f are arranged in tandem at a right end of the light emitting area 48 such that the partial light emitting area 64e lies above the partial light emitting area 64f. The partial light emitting area 64g and the partial light emitting area 64h are arranged in juxtaposition at a lower end of light emitting area 48 such that the partial light emitting area 64g lies on the left of the partial light emitting area 64h.

In the example in FIG. 12, as the partial light emitting area 64 associated with the particular light emitting area 96a illustrated in FIG. 7, the partial light emitting area 64a and the partial light emitting area 64c may be identified. Additionally, as the partial light emitting area 64 associated with the particular light emitting area 96b illustrated in FIG. 7, the partial light emitting area 64b and the partial light emitting area 64e may be identified. Additionally, as the partial light emitting area 64 associated with the particular light emitting area 96c illustrated in FIG. 7, the partial light emitting area 64d and the partial light emitting area 64g may be identified. Additionally, as the partial light emitting area 64 associated with the particular light emitting area 96d illustrated in FIG. 7, the partial light emitting area 64f and the partial light emitting area 64h may be identified.

In this case, the partial light emitting area 64a and partial light emitting area 64c of the controller 18a emit light in blue. The partial light emitting area 64b and partial light emitting area 64e of the controller 18b emit light in red. The partial light emitting area 64d and partial light emitting area 64g of the controller 18c emit light in green. The partial light emitting area 64f and partial light emitting area 64h of the controller 18d emit light in magenta.

Similarly, when the play status image 60 illustrated in FIG. 8 is displayed, the partial light emitting area 64a, partial light emitting area 64c, partial light emitting area 64d, and partial light emitting area 64g of the controller 18a emit light in blue. The partial light emitting area 64b, partial light emitting area 64e, partial light emitting area 64f, and partial light emitting area 64h of the controller 18b emit light in red.

Additionally, when the play status image 60 illustrated in FIG. 10 is displayed, the partial light emitting area 64a, partial light emitting area 64b, partial light emitting area 64c, and partial light emitting area 64e of the controller 18a emit light in blue. The partial light emitting area 64d, partial light emitting area 64f, partial light emitting area 64g, and partial light emitting area 64h of the controller 18b emit light in red.

Figure 13:
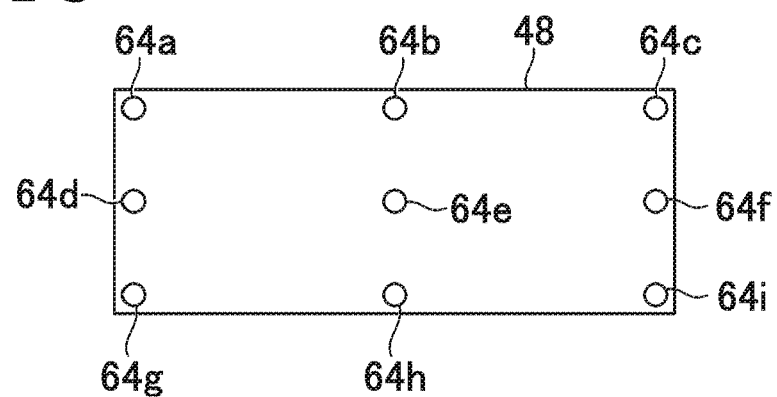
FIG. 13 is a diagram illustrating an example of a partial light emitting area.

FIG. 13 is a diagram illustrating another example of the partial light emitting area 64. In the example in FIG. 13, the partial light emitting areas 64a, 64b, and 64c are arranged in juxtaposition at the upper end of the light emitting area 48 in this order from the left of the light emitting area 48. The partial light emitting areas 64d, 64e, and 64f are arranged in juxtaposition at the center of the light emitting area 48 in this order from the left of the light emitting area 48. The partial light emitting areas 64g, 64h, and 64i are arranged in juxtaposition at the lower end of the light emitting area 48 in this order from the left of the light emitting area 48.

In this case, when the play status image 60 illustrated in FIG. 4 is displayed, the partial light emitting area 64a, partial light emitting area 64b, partial light emitting area 64d, and partial light emitting area 64e of the controller 18a may emit light in blue. Additionally, the partial light emitting area 64b, partial light emitting area 64c, partial light emitting area 64e, and partial light emitting area 64f of the controller 18b may emit light in red. Additionally, the partial light emitting area 64d, partial light emitting area 64e, partial light emitting area 64g, and partial light emitting area 64h of the controller 18c may emit light in green. Additionally, the partial light emitting area 64e, partial light emitting area 64f, partial light emitting area 64h, and partial light emitting area 64i of the controller 18d may emit light in magenta.

Additionally, when the play status image 60 illustrated in FIG. 8 is displayed, the partial light emitting area 64a, partial light emitting area 64b, partial light emitting area 64d, partial light emitting area 64e, partial light emitting area 64g, and partial light emitting area 64h of the controller 18a may emit light in blue. The partial light emitting area 64b, partial light emitting area 64c, partial light emitting area 64e, partial light emitting area 64f, partial light emitting area 64h, and partial light emitting area 64i of the controller 18b may emit light in red.

Additionally, when the play status image 60 illustrated in FIG. 10 is displayed, the partial light emitting area 64a, partial light emitting area 64b, partial light emitting area 64c, partial light emitting area 64d, partial light emitting area 64e, and partial light emitting area 64f of the controller 18a may emit light in red. The partial light emitting area 64d, partial light emitting area 64e, partial light emitting area 64f, partial light emitting area 64g, partial light emitting area 64h, and partial light emitting area 64i of the controller 18b may emit light in red.

Figure 14:
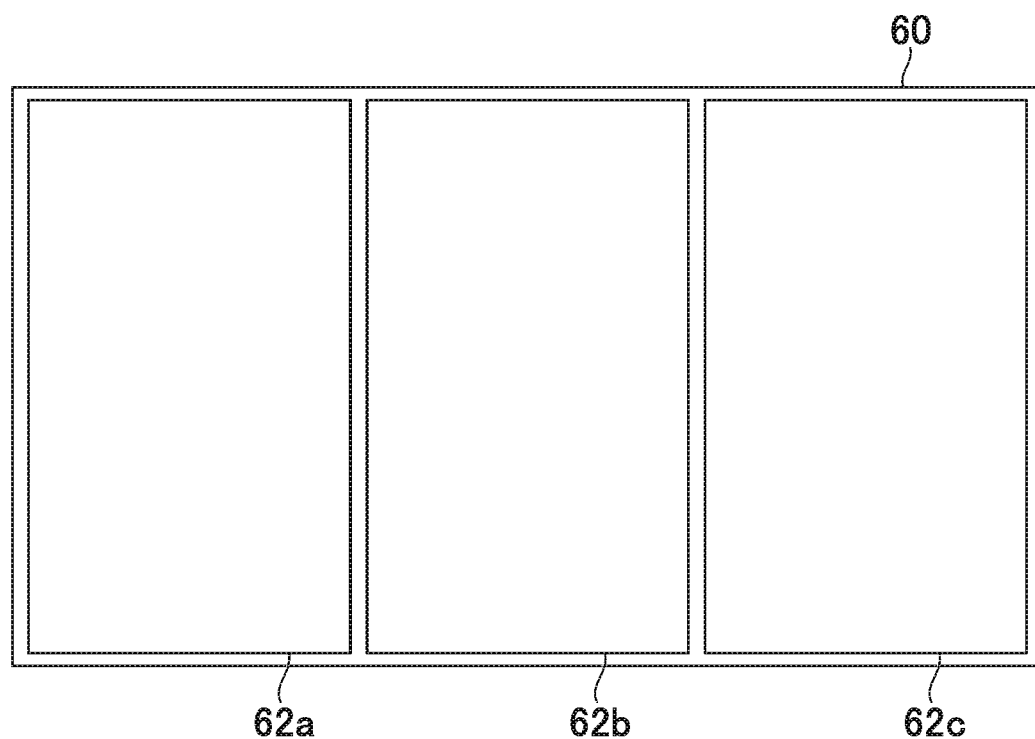
FIG. 14 is a diagram illustrating an example of a play status image.

In the example in FIG. 13, a case can be flexibly dealt with in which three play areas 62 are arranged in juxtaposition as illustrated in FIG. 14. FIG. 14 is a diagram schematically illustrating an example of the play status image 60 corresponding to the play status of a game played by three users. The play status image 60 illustrated in FIG. 14 illustrates the play statuses of the user operating the controller 18a, the user operating the controller 18b, and the user operating the controller 18c. In the example in FIG. 14, the play area 62a positioned in the left side of the play status image 60 depicts the play status of the user operating the controller 18a. Additionally, for example, the play area 62b positioned in the center of the play status image 60 depicts the play status of the user operating the controller 18b. Additionally, for example, the play area 62c positioned in the right side of the play status image 60 depicts the play status of the user operating the controller 18c.

Figure 15:
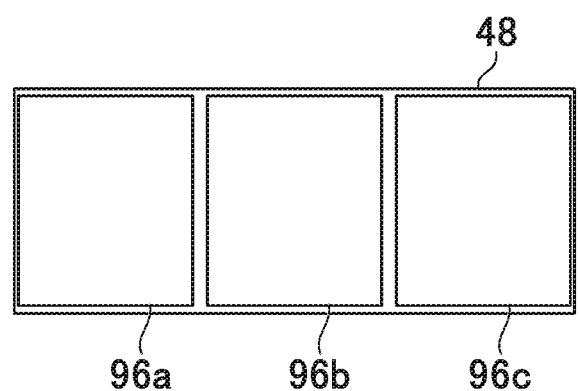
FIG. 15 is a diagram illustrating an example of a particular light emitting area.

In this case, as illustrated in FIG. 15, the particular light emitting area 96a positioned in the left side of the light emitting area 48 may be identified as the particular light emitting area 96 associated with the controller 18a. Similarly, the particular light emitting area 96b positioned in the center of the light emitting area 48 may be identified as the particular light emitting area 96 associated with the controller 18b. Additionally, the particular light emitting area 96c positioned in the right side of the light emitting area 48 may be identified as the particular light emitting area 96 associated with the controller 18c.

As the partial light emitting area 64 associated with the particular light emitting area 96a, the partial light emitting area 64a, partial light emitting area 64d, and partial light emitting area 64g illustrated in FIG. 13 may be identified. As the partial light emitting area 64 associated with the particular light emitting area 96b, the partial light emitting area 64b, partial light emitting area 64e, and partial light emitting area 64h illustrated in FIG. 13 may be identified. As the partial light emitting area 64 associated with the particular light emitting area 96c, the partial light emitting area 64c, partial light emitting area 64f, and partial light emitting area 64i illustrated in FIG. 13 may be identified.

The partial light emitting area 64a, partial light emitting area 64d, and partial light emitting area 64g of the controller 18a may emit light in blue. The partial light emitting area 64b, partial light emitting area 64e, and partial light emitting area 64h of the controller 18b may emit light in red. The partial light emitting area 64c, partial light emitting area 64f, and partial light emitting area 64i of the controller 18c may emit light in green.

Figure 16:
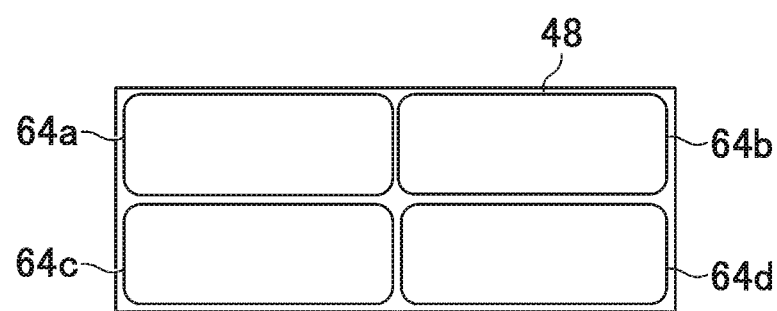
FIG. 16 is a diagram illustrating an example of a partial light emitting area.

Additionally, as illustrated in FIG. 16, the partial light emitting area 64 may include generally rectangular areas. In the example in FIG. 16, the partial light emitting area 64a positioned in the upper left of the light emitting area 48 is the partial light emitting area 64 associated with the particular light emitting area 96a illustrated in FIG. 7. The partial light emitting area 64b positioned in the upper right of the light emitting area 48 is the partial light emitting area 64 associated with the particular light emitting area 96b illustrated in FIG. 7. The partial light emitting area 64c positioned in the lower left of the light emitting area 48 is the partial light emitting area 64 associated with the particular light emitting area 96c illustrated in FIG. 7. The partial light emitting area 64d positioned in the lower right of the light emitting area 48 is the partial light emitting area 64 associated with the particular light emitting area 96d illustrated in FIG. 7.

Figure 17:
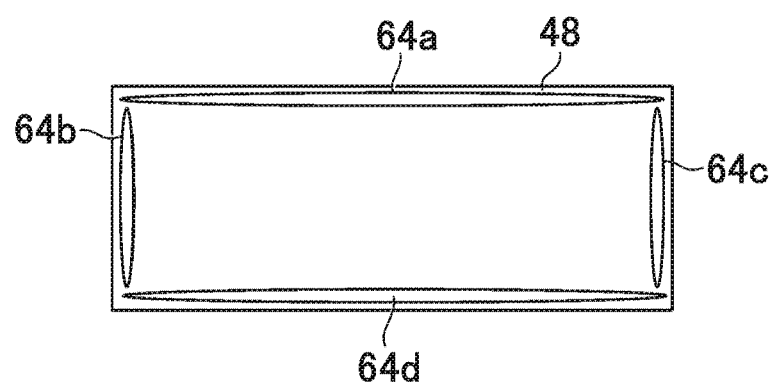
FIG. 17 is a diagram illustrating an example of a partial light emitting area.
Figure 18:
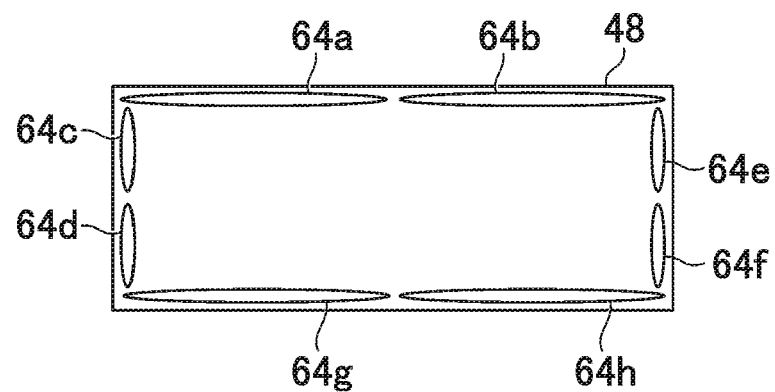
FIG. 18 is a diagram illustrating an example of a partial light emitting area.

Additionally, as illustrated in FIG. 17 and FIG. 18, the partial light emitting area 64 may include band-like areas. The partial light emitting areas 64a, 64b, 64c, and 64d illustrated in FIG. 17 correspond to the partial light emitting areas 64a, 64b, 64c, and 64d illustrated in FIG. 5. The partial light emitting areas 64a, 64b, 64c, 64d, 64e, 64f, 64g, and 64h illustrated in FIG. 18 correspond to the partial light emitting areas 64a, 64b, 64c, 64d, 64e, 64f, 64g, and 64h illustrated in FIG. 12.

Figure 19:
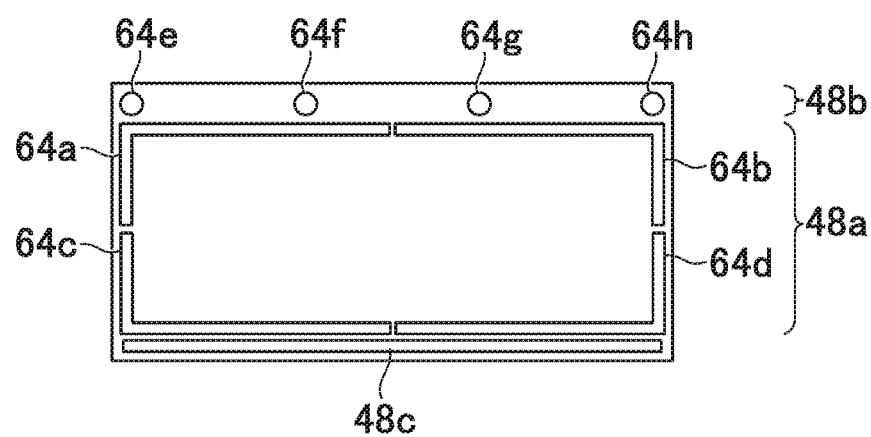
FIG. 19 is a diagram illustrating an example of a partial light emitting area.

Additionally, as illustrated in FIG. 19, the light emitting area 48 may include a first light emitting area 48a, a second light emitting area 48b, and a third light emitting area 48c. The first light emitting area 48a is, for example, an area that emits light to enable the particular light emitting area 96 to be recognized. The second light emitting area 48b is, for example, an area that emits light to enable the device ID of the controller 18 to be identified. The third light emitting area 48c is, for example, an area that emits light in accordance with the execution status of the program of the game.

Here, at least a part of the first light emitting area 48a and the third light emitting area 48c may emit light in accordance with a control signal corresponding to the execution status of the application program executed by the application program executing section 74. At least a part of the second light emitting area 48b may emit light in accordance with a control signal corresponding to the execution status of the system program executed by the system program executing section 72.

In the example in FIG. 19, the first light emitting area 48a includes partial light emitting areas 64a, 64b, 64c, and 64d. The second light emitting area 48b includes partial light emitting areas 64e, 64f, 64g, and 64h. The partial light emitting areas 64a, 64b, 64c, and 64d are respectively disposed in the upper left, upper right, lower left, and lower right of the first light emitting area 48a. The partial light emitting areas 64e, 64f, 64g, and 64h are arranged in juxtaposition in line from the left. Note that the arrangement of the first light emitting area 48a, the second light emitting area 48b, the third light emitting area 48c, and the partial light emitting areas 64 are not limited to the arrangement illustrated in FIG. 19.

The second light emitting area 48b may be controlled such that the partial light emitting area 64 at the position corresponding to the device ID of the controller 18 emits light. For example, for the controller 18a, the second light emitting area 48b may be controlled such that the partial light emitting area 64e emits light. Additionally, for example, for the controller 18b, the second light emitting area 48b may be controlled such that the partial light emitting area 64f emits light. Additionally, for example, for the controller 18c, the second light emitting area 48b may be controlled such that the partial light emitting area 64g emits light. Additionally, for example, for the controller 18d, the second light emitting area 48b may be controlled such that the partial light emitting area 64h emits light.

Alternatively, the second light emitting area 48b may be controlled such that a number of the partial light emitting areas 64 corresponding to the device ID of the controller 18 emit light. For example, for the controller 18a, the second light emitting area 48b may be controlled such that the partial light emitting area 64e emits light. Additionally, for example, for the controller 18b, the second light emitting area 48b may be controlled such that the partial light emitting area 64e and the partial light emitting area 64f emit light. Additionally, for example, for the controller 18c, the second light emitting area 48b may be controlled such that the partial light emitting area 64e, the partial light emitting area 64f, and the partial light emitting area 64g emit light. Additionally, for example, for the controller 18d, the second light emitting area 48b may be controlled such that the partial light emitting area 64e, the partial light emitting area 64f, the partial light emitting area 64g, and the partial light emitting area 64h emit light.

Additionally, control may be performed such that the second light emitting area 48b emits light in a color corresponding to the device ID of the controller 18.

For the first light emitting area 48a, for example, light emission control may be performed according to the play status image 60 as in the above description.

Figure 20:
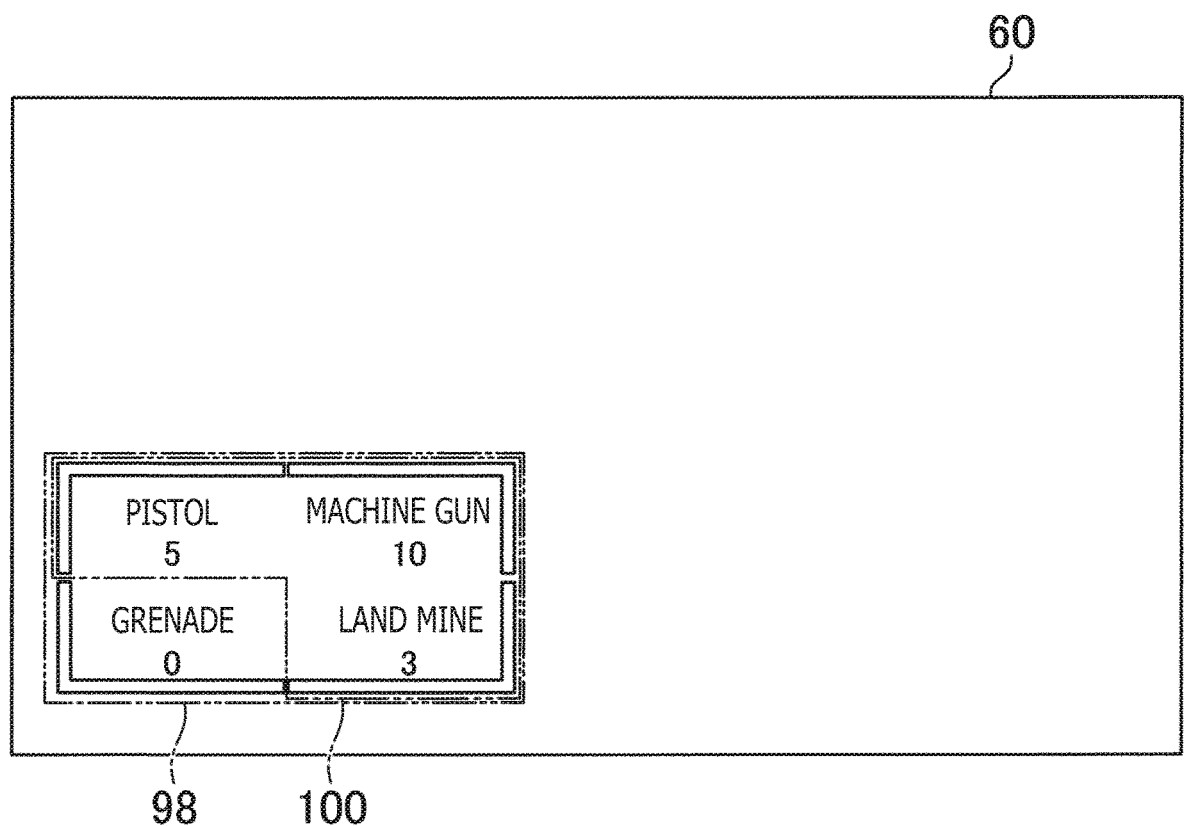
FIG. 20 is a diagram illustrating an example of a play status image.

Here, for example, the light emission control may be performed according to the play status image 60 illustrated in FIG. 20. The play status image 60 illustrated in FIG. 20 depicts the play status of a game played by one user. Here, for example, the play status image 60 illustrated in FIG. 20 is assumed to depict the play status of the user operating the controller 18a A reference display area 98 that is a lower left area of the play status image 60 illustrated in FIG. 20 depicts a list of weapons that can be used by the user in playing the game. Additionally, for each of the weapons, the number of times that the weapon can be used is indicated. In the example in FIG. 20, a pistol, a machine gun, a grenade, and a land mine are respectively depicted in the upper left, upper right, lower left, and lower right of the reference display area 98. The reference display area 98 indicates that the pistol can be used five times, the machine gun can be used ten times, and the land mine can be used three times. On the other hand, the reference display area 98 indicates that the use of the grenade is precluded.

In the present embodiment, for example, in response to an operation of touching the touch sensor 42 or an operation of depressing the touch sensor 42, the weapon corresponding to the position detected by the touch sensor 42 is used. For example, an operation of touching the upper left area of the touch sensor 42 causes the pistol to be used once in the game.

In this case, the particular-light-emitting-area identifying section 78a identifies, as a particular display area 100, an area covering the upper left, upper right, and lower right of the reference display area 98 and depicting the weapons that can be used one or more times. The particular-light-emitting-area identifying section 78a may then identify the particular light emitting area 96 the position of which in the light emitting area 48 is associated with the position of the particular display area 100 in the reference display area 98. For example, an area covering the upper left, upper right, and lower right of the first light emitting area 48a illustrated in FIG. 19 may be identified as the particular light emitting area 96. Then, the display control section 76 may perform control such that the partial light emitting areas 64a, 64b, and 64d associated with the particular light emitting area 96 emit light. In this case, the partial light emitting area 64c emits no light.

Note that, in the above-described example, the reference display area 98 is an area occupying a part of the play status image 60 but may be an area occupying the entire play status image 60. For example, in the examples in FIG. 4, FIG. 8, FIG. 10, and FIG. 14, the area occupying the entire play status image 60 corresponds to the reference display area 98. The play area 62 corresponds to the particular display area 100.

Additionally, in the present embodiment, in response to the user performing a predetermined play area changing operation, the input data accepting section 70 may accept, from the controller 18 operated by the user, input data indicating occurrence of the play area changing operation.

Then, in response to acceptance of the input data, the application program executing section 74 may change the particular display area 100 in the play status image 60. For example, it is assumed that the play area changing operation is performed while the play status image 60 illustrated in FIG. 8 is being displayed. In this case, the arrangement of the play areas 62 may be changed such that the play area 62a is positioned in the right side of the play status image 60, whereas the play area 62b is positioned in the left side of the play status image 60.

Then, in response to the change in the position of the particular display area 100, the light emission control section 80 may change light emission from at least a part of the light emitting area 48 to enable recognition of the particular light emitting area 96 associated with the changed particular display area 100. For example, for the controller 18a, the light emission may be changed such that the partial light emitting area 64a, partial light emitting area 64c, and partial light emitting area 64d illustrated in FIG. 5 emit light in blue. Additionally, for the controller 18b, the light emission may be changed such that the partial light emitting area 64a, partial light emitting area 64b, and partial light emitting area 64d illustrated in FIG. 5 emit light in red.

Additionally, in the present embodiment, the light emission control section 80 may control the area in the light emitting area 48 from which light is emitted and the light emission color in accordance with the execution status of the system program executed by the system program executing section 72 until execution of the application program is started. Then, after execution of the application program is started, the light emission control section 80 may control the area in the light emitting area 48 from which light is emitted and the light emission color in accordance with the execution status of the application program executed by the application program executing section 74.

For example, the light emitting section 40 is assumed to be provided in the front surface of the controller 18. In this case, control may be performed such that the light emitting section 40 emits light in a color corresponding to the device ID before execution of the program of the game is started. This light emission control is light emission control performed according to the execution status of the system program.

When execution of the program of the game is started, the application program executing section 74 may acquire an image captured by the camera 16a to identify the positions of the users on the basis of the positions of images of a plurality of the light emitting sections 40 included in the acquired image. Then, the application program executing section 74 may determine the arrangement of the play areas 62 in an initial state on the basis of the identified positions of the users. Then, the display control section 76 may cause the display 14 to display the play status image 60 in which the play areas 62 are arranged in accordance with the determination. Then, the light emission control section 80 may perform the above-described light emission control based on the play status image 60. This light emission control is light emission control performed in accordance with the execution status of the application program.

For example, it is assumed that the user operating the controller 18a is determined to be at the left and the user operating the controller 18b is determined to be at the right, with respect to the display 14. In this case, as illustrated in FIG. 8, the display 14 may display the play status image 60 in which the play area 62a is disposed in the left side, whereas the play area 62b is disposed in the right side. Control may then be performed such that the partial light emitting area 64a, partial light emitting area 64b, and partial light emitting area 64d, illustrated in FIG. 5, of the controller 18a emit light in blue. Control may then be performed such that the partial light emitting area 64a, partial light emitting area 64c, and partial light emitting area 64d, illustrated in FIG. 5, of the controller 18b emit light in red.

In contrast, it is assumed that the user operating the controller 18a is determined to be at the right and the user operating the controller 18b is determined to be at the left, with respect to the display 14. In this case, the display 14 may display the play status image 60 in which the play area 62b is disposed in the left side, whereas the play area 62a is disposed in the right side. Control may then be performed such that the partial light emitting area 64a, partial light emitting area 64c, and partial light emitting area 64d, illustrated in FIG. 5, of the controller 18a emit light in blue. Control may then be performed such that the partial light emitting area 64a, partial light emitting area 64b, and partial light emitting area 64d, illustrated in FIG. 5, of the controller 18b emit light in red.

Additionally, in the present embodiment, in a case where one user initially plays the game and another user later joins the game, the arrangement of the play areas 62 may be changed. For example, the play areas 62 may initially change from the entire play status image 60 to half of the area of the play status image 60. Additionally, for example, in a battle royale game, in a case where four users initially play the game, and the number of users who can play the game later changes to two due to occurrence of an event in the game (for example, killing of players), the play area 62 may change from a quarter of the area of the play status image 60 to half of the area of the play status image 60. Then, in response to detection of such a change in the play areas 62, the above-described light emission control may be performed.

Additionally, for example, to attract the user's attention to the controller 18, the vibrator 44 of the controller 18 may be vibrated or an image expressing the controller 18 emitting light may be displayed on the display 14. Furthermore, by a method of slightly delaying timing to display the image, delaying timing to provide feedback to the controller 18, or the like, the state of the controller 18 can be recognized with no look taken at the controller at the hands.

Note that the light emission control performed according to the execution status of the program is not limited to the above-described light emission control. The following description assumes that the light emitting areas 48 are arranged as illustrated in FIG. 19. Additionally, a selection operation for the partial light emitting area 64 as used herein refers to an operation of touching or depressing the touch sensor 42 at a position corresponding to the partial light emitting area 64.

For example, a gesture action in the game can be assigned to the upper left, upper right, lower left, and lower right areas of the touch sensor 42. Then, control may be performed such that the partial light emitting areas 64 emit light that are associated with the areas to which the gesture action is assigned, whereas the partial light emitting areas 64 to which the gesture action is not assigned are prevented from emitting light. For example, in a case where the gesture action is assigned to the upper left and upper right areas, control may be performed such that the partial light emitting area 64*a* and the partial light emitting area 64*b* emit light, whereas the partial light emitting area 64*c* and the partial light emitting area 64*d* are prevented from emitting light.

Additionally, character's special moves in the game may be assigned to the left area and the right area of the touch sensor 42. The special move assigned to the left area may be made in response to the selection operation on the partial light emitting area 64*a* or the partial light emitting area 64*c*, and the special move assigned to the right area may be made in response to the selection operation on the partial light emitting area 64*b* or the partial light emitting area 64*d*. Control may be performed such that, when one of the special moves is made in the game, the partial light emitting area 64 corresponding to the area to which the special move is assigned blinks for a predetermined time. Then, the special move may be prevented from being made during the predetermined time. Subsequently, this partial light emitting area 64 may be controlled to emit light. After the partial light emitting area 64 is controlled to emit light, the special move associated with this partial light emitting area 64 may be allowed to be made.

Additionally, for example, control may be performed such that the partial light emitting area 64 associated with the direction of an object in the game emits light.

Additionally, for example, a program of a game may be executed in which the user remembers that the partial light emitting areas 64 sequentially emit light in an irregular order and performs the selection operation on the partial light emitting areas 64 in order of the light emissions.

In the above-described examples, control of the light emission color may simultaneously be performed.

Additionally, for example, in a game resulting in a success in a case where the selection operation has been performed on the partial light emitting areas 64 in a prescribed order and otherwise in a failure, control may be performed such that the light emission color of the partial light emitting area 64 on which the selection operation has been performed changes from white to yellow. Control may then be performed such that the success changes the light emission color of all the partial light emitting areas 64 to green, whereas the failure changes the light emission color of all the partial light emitting areas 64 to red.

Additionally, for example, a program of a game may be executed in which the partial light emitting areas 64 included in the light emitting area 48 of the controller 18 randomly emit light in various colors and in which a success is achieved in a case where the selection operation is performed on the partial light emitting area 64 having emitted light in the color corresponding to the device ID of the controller 18.

Additionally, for example, an operation of determining the positions of the play areas 62 may be performed at the start of the game.

For example, control may be performed such that, for each of the controllers 18*a* to 18*d*, the partial light emitting area 64*a*, the partial light emitting area 64*b*, the partial light emitting area 64*c*, and the partial light emitting area 64*d* emit light in white at the start of the game. Here, for example, when the selection operation is performed on the partial light emitting area 64*a* of the controller 18*a*, the play area 62*a* illustrated in FIG. 4 may be determined to be the play area 62 for the user having performed the selection operation. In this case, control may be performed such that the partial light emitting area 64*a* of the controller 18*a* turns blue, whereas the partial light emitting area 64*a* of each of the other controllers 18 emits no light. In this manner, in response to an operation on one of the controllers 18, the light emission control section 80 may change the light emission from at least a part of the light emitting area 48 of each of the controllers 18 different from the one of the controllers 18.

Additionally, in a program utilizing the sensor section 38 such as a motion sensor provided in the controller 18, the light emission control in the present embodiment may be utilized. For example, in a game where a ball virtually disposed in the controller 18 is rolled, control may be performed such that the partial light emitting area 64 associated with the current position of the ball emits light. Additionally, for example, control is performed such that all the partial light emitting areas 64 are prevented from emitting light in a case where the controller 18 is level and that, in a case where the controller 18 is tilted, the partial light emitting area 64 at the position corresponding to the tilt emits light. For example, control may be performed such that, when the controller 18 is tilted down at the front left side, the partial light emitting area 64*a* emits light. In this manner, information corresponding to the execution status of the above-described program may include information corresponding to the output from the sensor section 38.

Additionally, the light emission control in the present embodiment may be utilized in display of a rev limiter, a turn signal, and hazard light in a race game utilizing the motion sensor provided in the controller 18.

Additionally, for example, the partial light emitting areas 64 may be used as options in a game simulating a quiz show. Control may then be performed such that the partial light emitting area 64 on which the selection operation is performed emits light. At this time, control may be performed such that the light emission is in the color corresponding to the device ID. Control may then be performed such that, in the case of a correct answer, the third light emitting area 48c emits light in green and that in the case of an incorrect answer, the third light emitting area 48c emits light in red.

Note that the present invention is not limited to the above-described embodiments.

For example, the storage section 32 of the controller 18 may store light emission color data indicating light emission colors and light emission pattern data indicating light emission patterns such as areas for which light is to be emitted, the light emission color data and the light emission pattern data being associated with the device IDs. In response to transmission, by the controller 18, of a connection request to the entertainment apparatus 12, the entertainment apparatus 12 may transmit, to the controller 18, the device ID set for the controller 18. The controller 18 may then perform the light emission control as described above on the basis of the light emission color data and light emission pattern data associated with the device ID.

Additionally, the functions of the touch sensor 42 and the light emitting section 40 included in the controller 18 may be implemented in the touch sensor including a liquid crystal display. In this case, control may be performed such that the areas in the light emitting section 40 other than the particular light emitting area 96 in the light emitting area 48 emit light in a color different from the color corresponding to the device ID. For example, the control may be performed such that the areas in the light emitting section 40 other than the particular light emitting area 96 in the light emitting area 48 emit light in white.

Additionally, the positions, shapes, and sizes of the partial light emitting areas 64 are not limited to positions, shapes, and sizes described above. Additionally, the light emitting area 48 need not be set on the upper surface of the controller 18. For example, a part or all of the light emitting area 48 may be set on the front surface of the controller 18.

Additionally, the above-described specific character strings and numerical values and the specific character strings and numerical values in the drawings are illustrative, and the present invention is not limited to these character strings and numerical values.

The invention claimed is:

1. A light emission control apparatus comprising:
 a particular-light-emitting-area identifying section identifying, on a basis of information corresponding to an execution status of a program, a particular light emitting area that is a part of a light emitting area set on an operation device, the part corresponding to the information, where the information includes information causing a display section to display an image,
 a light emission control section causing at least a part of the light emitting area to emit light to make the particular light emitting area recognizable, and
 a particular-display-area identifying section identifying a particular display area that is a portion of a reference display area occupying at least a part of the image, the portion being associated with the operation device.

2. The light emission control apparatus according to claim 1, wherein the particular-light-emitting-area identifying section identifies the particular light emitting area in which a position in the light emitting area is associated with a position of the particular display area in the reference display area.

3. The light emission control apparatus according to claim 2, further comprising:
 a display control section causing the display section to display the image depicting, in the reference display area, a play status of each of a plurality of users, the play status corresponding to an execution status of a program of a game played by the plurality of users,
 wherein the particular-display-area identifying section identifies, as the particular display area, an area in the image depicting the play status of the user operating the operation device.

4. The light emission control apparatus according to claim 3, further comprising:
 a particular-display-area changing section changing a position of the particular display area in the reference display area,
 wherein the light emission control section changes, in response to a change in the position of the particular display area, light emission from at least a part of the light emitting area such that the particular light emitting area associated with the changed particular display area is recognizable.

5. The light emission control apparatus according to claim 1, wherein
 the light emitting area includes a plurality of partial light emitting areas, and
 the light emission control section causes at least one of the partial light emitting areas associated with the particular light emitting area to emit light.

6. The light emission control apparatus according to claim 1, wherein the light emission control section causes at least a part of the light emitting area to emit light to make a color and the particular light emitting area corresponding to the information recognizable.

7. The light emission control apparatus according to claim 1, wherein the light emission control section causes at least a part of the light emitting area to emit light to make the particular light emitting area recognizable and to make identification information associated with the operation device identifiable.

8. The light emission control apparatus according to claim 7, wherein
 the light emitting area includes a first light emitting area and a second light emitting area,
 the particular-light-emitting-area identifying section identifies the particular light emitting area that is a part of the first light emitting area, the part corresponding to the image,
 the light emission control section causes at least a part of the first light emitting area to emit light to make the particular light emitting area recognizable, and
 the light emission control section causes at least a part of the second light emitting area to emit light to make the identification information identifiable.

9. The light emission control apparatus according to claim 1, wherein
 the light emission control apparatus connects to a plurality of the operation devices, and
 the light emission control section changes, in response to an operation on one of the operation devices, light emission from at least a part of the light emitting area of the operation device different from the one of the operation devices.

10. The light emission control apparatus according to claim 1, wherein the information includes information corresponding to an output from a sensor section.

11. An operation device with a set light emitting area, the operation device comprising:

a reception section receiving light emission control information identifying a part of the light emitting area on a basis of information corresponding to an execution status of a program, where the information includes information causing a display section to display an image;

a light emission control section causing a part of the light emitting area to emit light in accordance with the light emission control information; and a particular-display-area identifying section identifying a particular display area that is a portion of a reference display area occupying at least a part of the image, the portion being associated with the operation device.

12. The operation device according to claim 11, comprising:

a touch sensor, wherein the touch sensor and the light emitting area at least partly overlap each other as viewed from above.

13. The operation device according to claim 12, wherein light emitting sections are provided at positions corresponding to corner portions of the touch sensor.

14. The operation device according to claim 12, wherein a light emitting section is provided at a position corresponding to a central portion of the touch sensor.

15. An operation device with a set first light emitting area and a set second light emitting area, wherein at least a part of the first light emitting area emits light to make a particular light emitting area recognizable, the particular light emitting area being a part corresponding to an image displayed on a display section, at least a part of the second light emitting area emits light to make identification information associated with the operation device identifiable, and identifying a particular display area that is a portion of a reference display area occupying at least a part of the image, the portion being associated with the operation device.

16. The operation device according to claim 15, wherein at least a part of the first light emitting area emits light in accordance with a control signal corresponding to an execution status of an application program, and at least a part of the second light emitting area emits light in accordance with a control signal corresponding to an execution status of a system program.

17. A light emission control method comprising:

identifying, on a basis of information corresponding to an execution status of a program, a particular light emitting area that is a part of a light emitting area set on an operation device, the part corresponding to the information, where the information includes information causing a display section to display an image; and causing at least a part of the light emitting area to emit light to make the particular light emitting area recognizable; and identifying a particular display area that is a portion of a reference display area occupying at least a part of the image, the portion being associated with the operation device.

18. A non-transitory, computer readable storage medium containing a computer program, which when executed by a computer, causes the computer to execute a light emission control method by carrying out actions, comprising:

identifying, on a basis of information corresponding to an execution status of a program, a particular light emitting area that is a part of a light emitting area set on an operation device, the part corresponding to the information, where the information includes information causing a display section to display an image; and causing at least a part of the light emitting area to emit light to make the particular light emitting area recognizable; and identifying a particular display area that is a portion of a reference display area occupying at least a part of the image, the portion being associated with the operation device.

* * * * *